US010447413B1

(12) United States Patent
Nadakuduti et al.

(10) Patent No.: US 10,447,413 B1
(45) Date of Patent: Oct. 15, 2019

(54) EVALUATING RADIO FREQUENCY EXPOSURE

(71) Applicant: QUALCOMM Incorporated, San Diego, CA (US)

(72) Inventors: Jagadish Nadakuduti, Mission Viejo, CA (US); Lin Lu, San Diego, CA (US); Paul Guckian, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/189,274

(22) Filed: Nov. 13, 2018

(51) Int. Cl.
*H04W 52/02* (2009.01)
*H04B 17/10* (2015.01)
*H04W 52/22* (2009.01)
*H04B 1/3827* (2015.01)
*H04W 52/36* (2009.01)
*H04B 17/40* (2015.01)

(52) U.S. Cl.
CPC ......... *H04B 17/102* (2015.01); *H04B 1/3838* (2013.01); *H04B 17/104* (2015.01); *H04W 52/225* (2013.01); *H04W 52/367* (2013.01); *H04B 17/40* (2015.01)

(58) Field of Classification Search
CPC .. H04B 17/102; H04B 17/104; H04B 1/3838; H04W 52/12; H04W 52/146; H04W 52/16; H04W 52/225; H04W 52/367
See application file for complete search history.

(56) References Cited

U.S. PATENT DOCUMENTS

| | | | |
|---|---|---|---|
| 9,237,531 B2 | 1/2016 | Lu et al. | |
| 2004/0038697 A1* | 2/2004 | Attar | H04W 52/48 455/522 |
| 2006/0003790 A1* | 1/2006 | Marinier | H04W 52/223 455/522 |
| 2007/0133483 A1* | 6/2007 | Lee | H04W 52/343 370/338 |
| 2008/0198775 A1* | 8/2008 | Nejatian | H04W 52/52 370/280 |

\* cited by examiner

*Primary Examiner* — Thanh C Le
(74) *Attorney, Agent, or Firm* — Patterson & Sheridan, LLP (57) ABSTRACT

Methods and systems for assessing radio frequency (RF) exposure from a wireless device. An example apparatus generally includes at least one processor configured to determine a time-averaged radio frequency (RF) exposure measurement over a time window, comprising a number of time slots, accounting for a future time slot; determine a maximum allowed transmission power level for the future time slot based on a reduced power limit and the time-averaged RF exposure measurement, the reduced power limit being less than a transmission power limit for the time window; and set a transmission power level for the future time slot based on the maximum allowed transmission power level. The example apparatus also includes an interface configured to output one or more signals for transmission during the future time slot at the transmission power level.

20 Claims, 6 Drawing Sheets

EVALUATING RADIO FREQUENCY EXPOSURE

FIELD OF THE DISCLOSURE

Certain aspects of the present disclosure generally relate to wireless devices and, more particularly, to systems and methods for assessing radio frequency (RF) exposure from a wireless device.

DESCRIPTION OF RELATED ART

Modern wireless devices (such as cellular phones) are generally required to meet radio frequency (RF) exposure limits set by domestic and international standards and regulations. To ensure compliance with the standards, such devices must currently undergo an extensive certification process prior to being shipped to market. To ensure that a wireless device complies with an RF exposure limit, techniques have been developed to enable the wireless device to assess RF exposure from the wireless device in real time and adjust the transmission power of the wireless device accordingly to comply with the RF exposure limit.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description," one will understand how the features of this disclosure provide advantages that include improved systems and methods for assessing RF exposure from a wireless device.

Certain aspects of the present disclosure provide an apparatus for wireless communications. The apparatus generally includes at least one processor configured to determine a time-averaged radio frequency (RF) exposure measurement over a time window, comprising a number of time slots, accounting for a future time slot; determine a maximum allowed transmission power level for the future time slot based on a reduced power limit and the time-averaged RF exposure measurement, the reduced power limit being less than a transmission power limit for the time window; and set a transmission power level for the future time slot based on the maximum allowed transmission power level. The apparatus also includes an interface configured to output one or more signals for transmission during the future time slot at the transmission power level.

Certain aspects of the present disclosure provide a method for wireless communications. The method generally includes determining a time-averaged RF exposure measurement over a time window, comprising a number of time slots, accounting for a future time slot; determining a maximum allowed transmission power level for the future time slot based on a reduced power limit and the time-averaged RF exposure measurement, the reduced power limit being less than a transmission power limit for the time window; setting a transmission power level for the future time slot based on the maximum allowed transmission power level; and transmitting one or more signals during the future time slot at the transmission power level.

Certain aspects of the present disclosure provide an apparatus for wireless communications. The apparatus generally includes means for determining a time-averaged RF exposure measurement over a time window, comprising a number of time slots, accounting for a future time slot; means for determining a maximum allowed transmission power level for the future time slot based on a reduced power limit and the RF exposure measurement, the reduced power limit being less than a transmission power limit for the time window; means for setting a transmission power level for the future time slot based on the maximum allowed transmission power level; and means for transmitting one or more signals during the future time slot at the transmission power level.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Aspects of the present disclosure provide apparatus and methods for evaluating radio frequency (RF) exposure from a wireless device.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (SGTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

NR access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communication System

Figure 1:
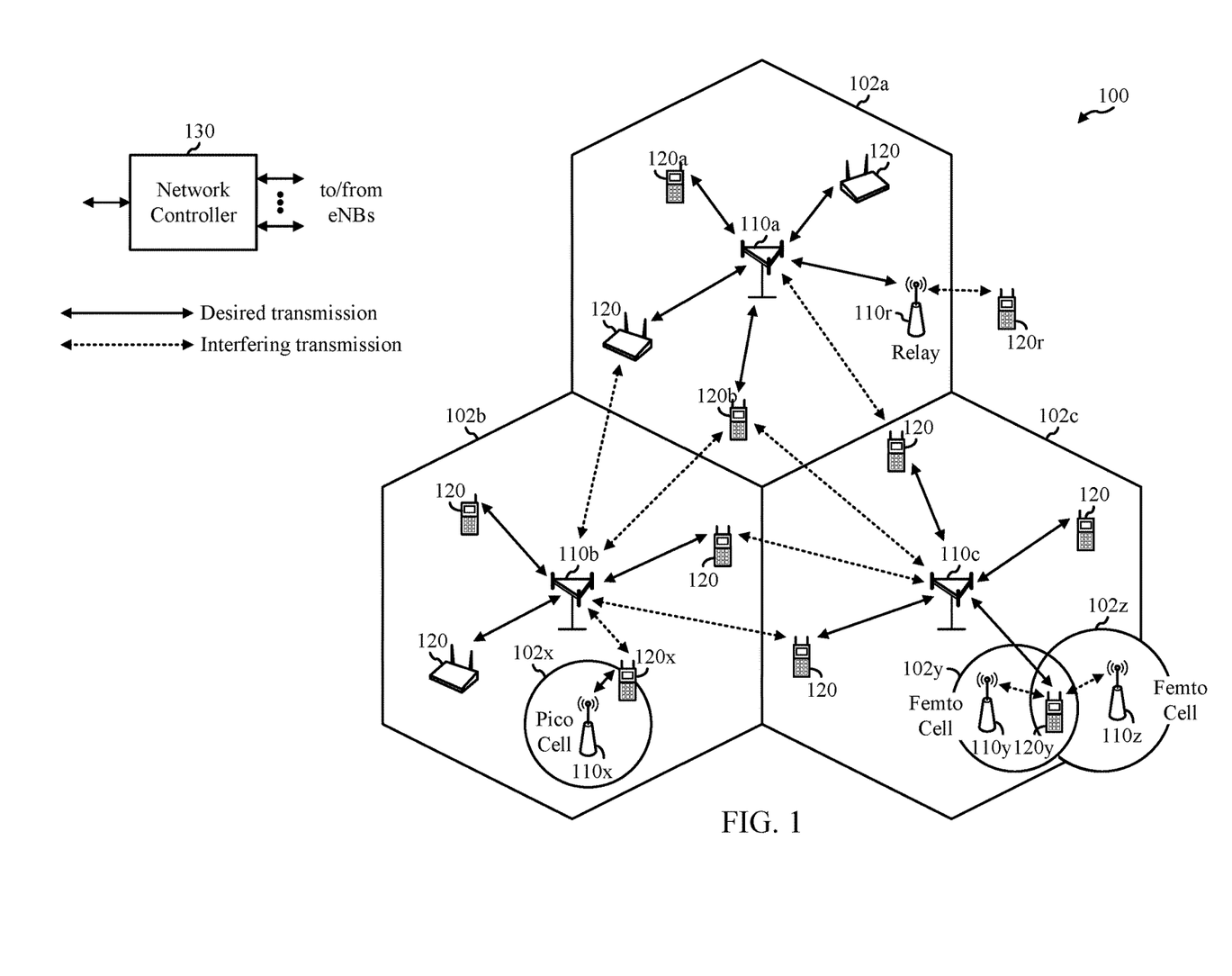
FIG. 1 is a block diagram conceptually illustrating an example telecommunications system, in accordance with certain aspects of the present disclosure.

FIG. 1 illustrates an example wireless communication network 100 in which aspects of the present disclosure may be performed. Wireless devices in the wireless network 100 may perform the methods to ensure compliance with RF exposure limits as further described herein.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation Node B (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110*a* and the UE 120*r*. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, a macro BS may have a high transmit power level (e.g., 20 watts (W)) whereas a pico BS, a femto BS, and relays may have a lower transmit power level (e.g., 1 W).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120*x*, 120*y*, etc.) may be dispersed throughout the wireless network 100, and each UE may be stationary or mobile. A UE may also be referred to as a mobile station (MS), a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a Global Positioning System (GPS) device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz, and the minimum resource allocation (called a "resource block" (RB)) may be 12 subcarriers (or 180 kHz). Consequently, the nominal Fast Fourier Transfer (FFT) size may be equal to 128, 256, 512, 1024, or 2048 for a system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for a system bandwidth of 1.25, 2.5, 5, 10, or 20 MHz, respectively.

While aspects of the examples described herein may be associated with LTE technologies, aspects of the present disclosure may be applicable with other wireless communications systems, such as NR. NR may utilize OFDM with a cyclic prefix (CP) on the uplink and downlink and include support for half-duplex operation using time-division duplexing (TDD). Beamforming may be supported, and beam direction may be dynamically configured. Multiple-input, multiple-output (MIMO) transmissions with precoding may also be supported. MIMO configurations in the downlink (DL) may support up to 8 transmit antennas with multi-layer DL transmissions up to 8 streams and up to 2 streams per UE. Aggregation of multiple cells may be supported with up to 8 serving cells.

In some examples, access to the air interface may be scheduled, wherein a scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Figure 2:
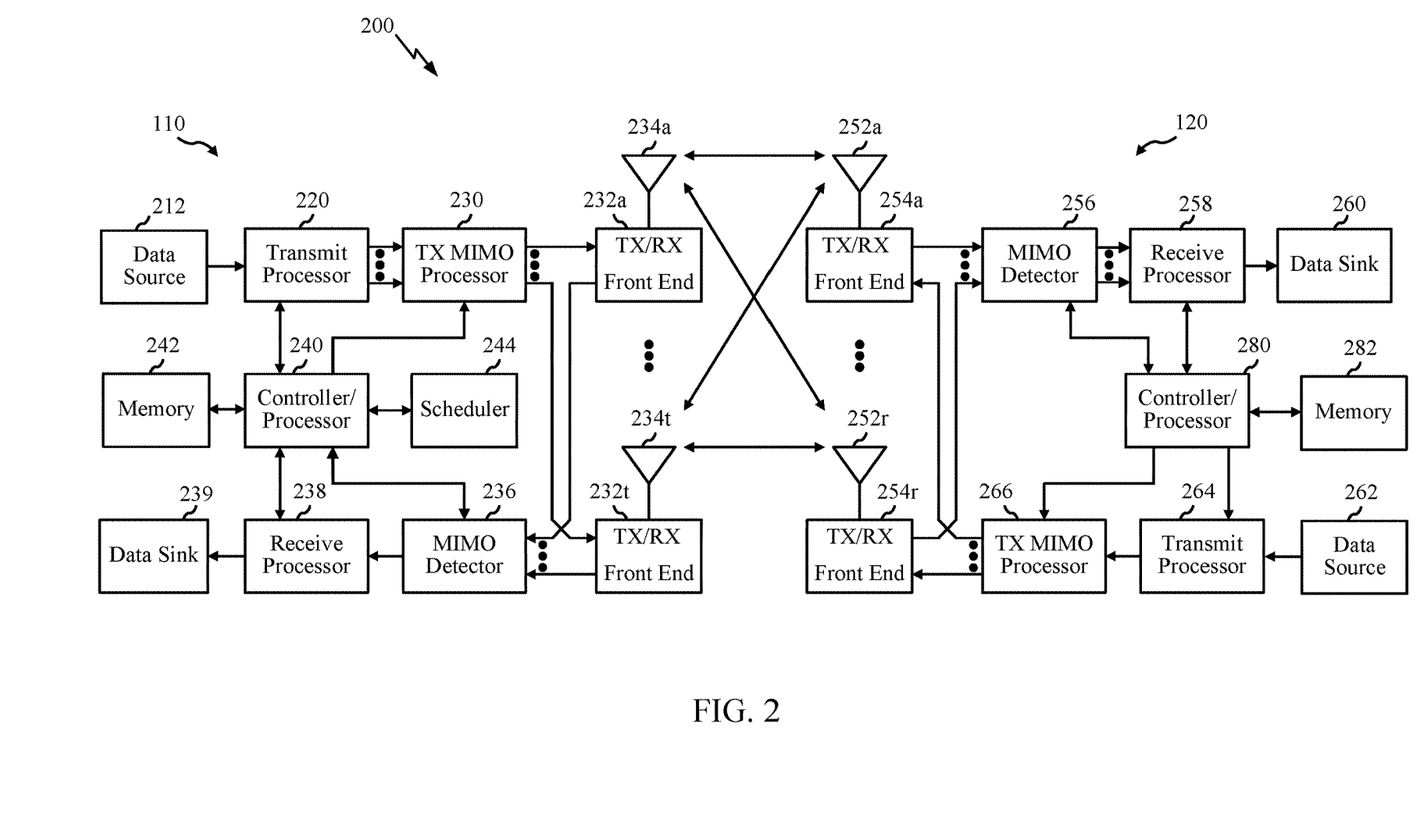
FIG. 2 is a block diagram conceptually illustrating a design of an example base station (BS) and an example user equipment (UE), in accordance with certain aspects of the present disclosure.

FIG. 2 illustrates example components of BS 110 and UE 120 (as depicted in FIG. 1), which may be used to implement aspects of the present disclosure. For example, antennas 252, processors 266, 258, 264, and/or controller/processor 280 of the UE 120 and/or antennas 234, processors 220, 240, 238, and/or controller/processor 240 of the BS 110 may be used to perform the various techniques and methods described herein (e.g., operations 600 of FIG. 6).

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The processor 220 may also generate reference symbols, e.g., for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the transmit (TX) front-end circuits 232a through 232t. Each TX front-end circuit 232 may process a respective output symbol stream (e.g., for OFDM, etc.) to obtain an output sample stream. Each TX front-end circuit may further process (e.g., convert to analog, amplify, filter, and upconvert) the output sample stream to obtain a downlink signal. Downlink signals from TX front-end circuits 232a through 232t may be transmitted via the antennas 234a through 234t, respectively.

At the UE 120, the antennas 252a through 252r may receive the downlink signals from the BS 110 and may provide received signals to the receive (RX) front-end circuits 254a through 254r, respectively. Each RX front-end circuit 254 may condition (e.g., filter, amplify, downconvert, and digitize) a respective received signal to obtain input samples. Each RX front-end circuit may further process the input samples (e.g., for OFDM, etc.) to obtain received symbols. A MIMO detector 256 may obtain received symbols from all the RX front-end circuits 254a through 254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the RX front-end circuits 254a through 254r (e.g., for SC-FDM, etc.), and transmitted to the BS 110. At the BS 110, the uplink signals from the UE 120 may be received by the antennas 234, processed by the TX front-end circuits 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the BS 110 and the UE 120, respectively. The processor 240 and/or other processors and modules at the BS 110 may perform or direct the execution of processes for the techniques described herein. The memories 242 and 282 may store data and program codes for BS 110 and UE 120, respectively. A scheduler 244 may schedule UEs for data transmission on the downlink and/or uplink. In certain aspects, the TX/RX front-end circuits 232, 254 may include a tuning circuit for adjusting a source impedance seen by a portion of a receive path, as further described herein.

Figure 3:
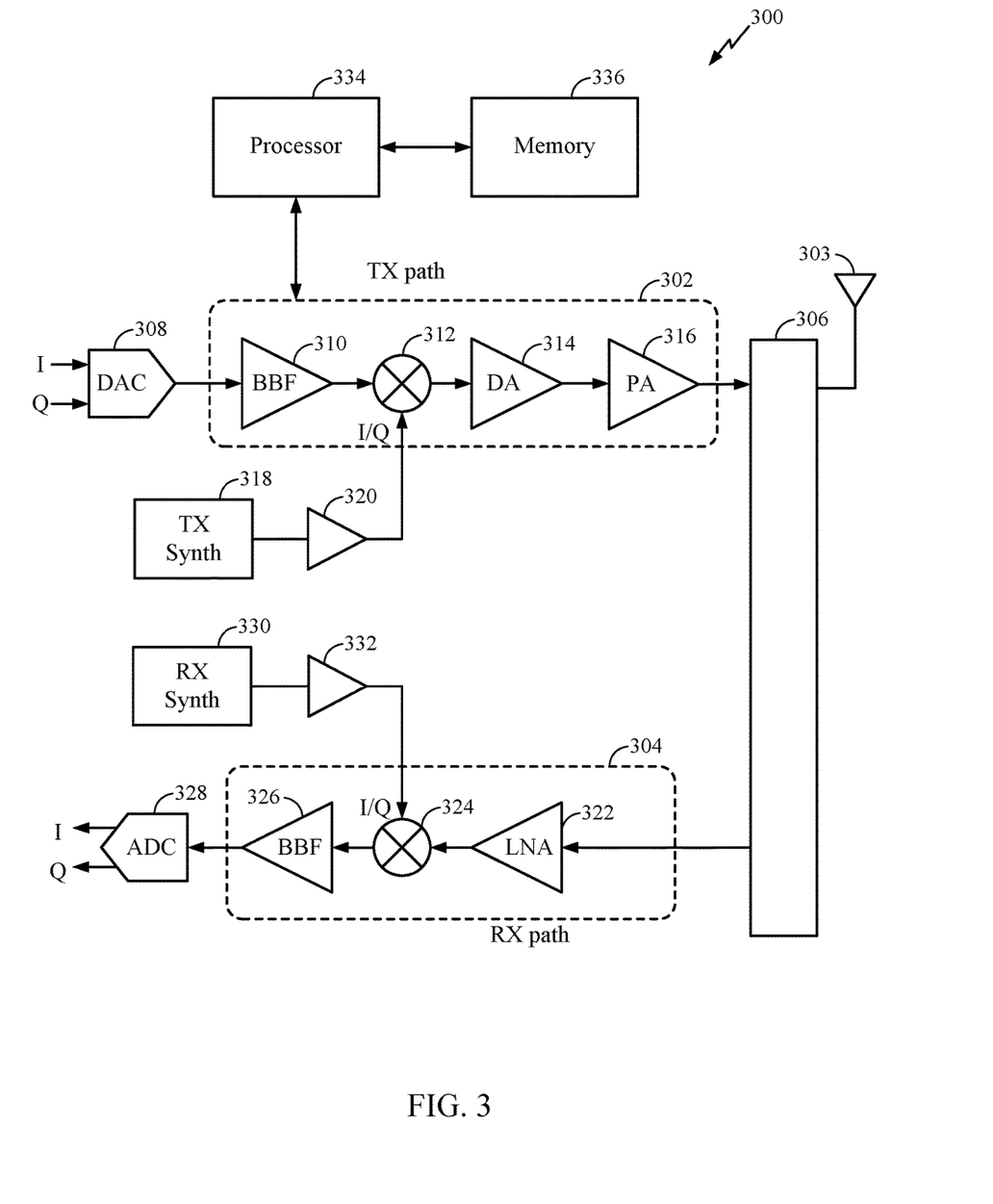
FIG. 3 is a block diagram showing an example transceiver front-end, in accordance with certain aspects of the present disclosure.

FIG. 3 is a block diagram of an example transceiver front-end 300, such as TX/RX front-end circuits 232, 254 in FIG. 2, in accordance with certain aspects of the present disclosure. The transceiver front-end 300 includes at least one transmit (TX) path 302 (also known as a transmit chain) for transmitting signals via one or more antennas and at least one receive (RX) path 304 (also known as a receive chain) for receiving signals via the antennas. When the TX path 302 and the RX path 304 share an antenna 303, the paths may be connected with the antenna via an RF interface 306, which may include any of various suitable RF devices, such as a duplexer, a switch, a diplexer, and the like.

Receiving in-phase (I) or quadrature (Q) baseband analog signals from a digital-to-analog converter (DAC) 308, the TX path 302 may include a baseband filter (BBF) 310, a mixer 312, a driver amplifier (DA) 314, and a power amplifier (PA) 316. The BBF 310, the mixer 312, and the DA 314 may be included in a radio frequency integrated circuit (RFIC), while the PA 316 may be included in the RFIC or external to the RFIC. The BBF 310 filters the baseband signals received from the DAC 308, and the mixer 312 mixes the filtered baseband signals with a transmit local oscillator (LO) signal to convert the baseband signal of interest to a different frequency (e.g., upconvert from baseband to RF). This frequency conversion process produces the sum and difference frequencies between the LO frequency and the frequencies of the baseband signal of interest. The sum and difference frequencies are referred to as the beat frequencies. The beat frequencies are typically in the RF range, such that the signals output by the mixer 312 are typically RF signals, which may be amplified by the DA 314 and/or by the PA 316 before transmission by the antenna 303.

The RX path 304 may include a low noise amplifier (LNA) 322, a mixer 324, and a baseband filter (BBF) 326. The LNA 322, the mixer 324, and the BBF 326 may be included in a radio frequency integrated circuit (RFIC), which may or may not be the same RFIC that includes the TX path components. RF signals received via the antenna 303 may be amplified by the LNA 322, and the mixer 324 mixes the amplified RF signals with a receive local oscillator (LO) signal to convert the RF signal of interest to a different baseband frequency (i.e., downconvert). The baseband signals output by the mixer 324 may be filtered by the BBF 326 before being converted by an analog-to-digital converter (ADC) 328 to digital I or Q signals for digital signal processing.

While it is desirable for the output of an LO to remain stable in frequency, tuning to different frequencies may indicate using a variable-frequency oscillator, which can involve compromises between stability and tunability. Contemporary systems may employ frequency synthesizers with a voltage-controlled oscillator (VCO) to generate a stable, tunable LO with a particular tuning range. Thus, the transmit LO may be produced by a TX frequency synthesizer 318, which may be buffered or amplified by amplifier 320 before being mixed with the baseband signals in the mixer 312. Similarly, the receive LO may be produced by an RX frequency synthesizer 330, which may be buffered or amplified by amplifier 332 before being mixed with the RF signals in the mixer 324.

Example RF Exposure Measurement

As shown, the transceiver front-end 300 may also include a processor 334 and memory 336 coupled to the TX path 302. The processor 334 may determine time-averaged RF exposure measurements based on transmission power levels applied to the TX path 302 (e.g., gain levels for the PA 316) to set a transmission power level for a future time slot that meets a predetermined RF exposure limit set by domestic and international regulations as further described herein. RF exposure may be expressed in terms of a specific absorption rate (SAR), which measures energy absorption by human tissue per unit mass and may have units of watts per kilogram (W/kg). RF exposure may also be expressed in terms of power density (PD), which measures energy absorption per unit area and may have units of mW/cm².

SAR may be used to assess RF exposure for transmission frequencies less than 6 GHz, which cover wireless communication technologies such as 3G (e.g., CDMA), 4G (e.g., LTE), 5G (e.g., NR in 6 GHz bands), IEEE 802.11ac, etc. PD may be used to assess RF exposure for transmission frequencies higher than 10 GHz, which cover wireless communication technologies such as IEEE 802.11ad, 802.11ay, 5G, etc. Thus, different metrics may be used to assess RF exposure for different wireless communication technologies.

A wireless device (e.g., UE 120) may simultaneously transmit signals using multiple wireless communication technologies. For example, the wireless device may simultaneously transmit signals using a first wireless communication technology operating at or below 6 GHz (e.g., 3G, 4G, 5G, etc.) and a second wireless communication technology operating above 6 GHz (e.g., 5G in 24 to 60 GHz bands, IEEE 802.11ad or 802.11ay). In certain aspects, the wireless device may simultaneously transmit signals using the first wireless communication technology (e.g., 3G, 4G, 5G in 6 GHz bands, IEEE 802.11ac, etc.) in which RF exposure is measured in terms of SAR, and the second wireless communication technology (e.g., 5G in 24 to 60 GHz bands, IEEE 802.11ad, 802.11ay, etc.) in which RF exposure is measured in terms of PD.

To assess RF exposure from transmissions using the first technology (e.g., 3G, 4G, 5G in 6 GHz bands, IEEE 802.11ac, etc.), the wireless device may include multiple SAR distributions for the first technology stored in memory (e.g., memory 282 of FIG. 2 or memory 336 of FIG. 3). Each of the SAR distributions may correspond to a respective one of multiple transmit scenarios supported by the wireless device for the first technology. The transmit scenarios may correspond to various combinations of antennas (e.g., antennas 252a through 252r of FIG. 2 or antenna 303 of FIG. 3), frequency bands, channels and/or body positions, as discussed further below.

The SAR distribution (also referred to as a SAR map) for each transmit scenario may be generated based on measurements (e.g., E-field measurements) performed in a test laboratory using a model of a human body. After the SAR distributions are generated, the SAR distributions are stored in the memory to enable a processor (e.g., processor 266 of FIG. 2 or processor 334 of FIG. 3) to assess RF exposure in real time, as discussed further below. Each SAR distribution includes a set of SAR values, where each SAR value may correspond to a different location (e.g., on the model of the human body). Each SAR value may comprise a SAR value averaged over a mass of 1 g or 10 g at the respective location.

The SAR values in each SAR distribution correspond to a particular transmission power level (e.g., the transmission power level at which the SAR values were measured in the test laboratory). Since SAR scales with transmission power level, the processor may scale a SAR distribution for any transmission power level by multiplying each SAR value in the SAR distribution by the following transmission power scaler:

$$\frac{Tx_c}{Tx_{SAR}} \quad (1)$$

where $Tx_c$ is a current transmission power level for the respective transmit scenario, and $TX_{SAR}$ is the transmission power level corresponding to the SAR values in the stored SAR distribution (e.g., the transmission power level at which the SAR values were measured in the test laboratory).

As discussed above, the wireless device may support multiple transmit scenarios for the first technology. In certain aspects, the transmit scenarios may be specified by a set of parameters. The set of parameters may include one or more of the following: an antenna parameter indicating one or more antennas used for transmission (i.e., active antennas), a frequency band parameter indicating one or more frequency bands used for transmission (i.e., active frequency bands), a channel parameter indicating one or more channels used for transmission (i.e., active channels), a body position parameter indicating the location of the wireless device relative to the user's body location (head, trunk, away from the body, etc.), and/or other parameters. In cases where the wireless device supports a large number of transmit scenarios, it may be very time-consuming and expensive to perform measurements for each transmit scenario in a test setting (e.g., test laboratory). To reduce test time, measurements may be performed for a subset of the transmit scenarios to generate SAR distributions for the subset of transmit scenarios. In this example, the SAR distribution for each of the remaining transmit scenarios may be generated by combining two or more of the SAR distributions for the subset of transmit scenarios, as discussed further below.

For example, SAR measurements may be performed for each one of the antennas to generate a SAR distribution for each one of the antennas. In this example, a SAR distribution for a transmit scenario in which two or more of the antennas are active may be generated by combining the SAR distributions for the two or more active antennas.

In another example, SAR measurements may be performed for each one of multiple frequency bands to generate a SAR distribution for each one of the multiple frequency bands. In this example, a SAR distribution for a transmit scenario in which two or more frequency bands are active may be generated by combining the SAR distributions for the two or more active frequency bands.

In certain aspects, a SAR distribution may be normalized with respect to a SAR limit by dividing each SAR value in the SAR distribution by the SAR limit. In this case, a normalized SAR value exceeds the SAR limit when the normalized SAR value is greater than one, and is below the SAR limit when the normalized SAR value is less than one. In these aspects, each of the SAR distributions stored in the memory may be normalized with respect to a SAR limit.

In certain aspects, the normalized SAR distribution for a transmit scenario may be generated by combining two or more normalized SAR distributions. For example, a normalized SAR distribution for a transmit scenario in which two or more antennas are active may be generated by combining the normalized SAR distributions for the two or more active antennas. For the case in which different transmission power levels are used for the active antennas, the normalized SAR distribution for each active antenna may be scaled by the respective transmission power level before combining the normalized SAR distributions for the active antennas. The normalized SAR distribution for simultaneous transmission from multiple active antennas may be given by the following:

$$SAR_{norm\_combined} = \sum_{i=1}^{i=K} \frac{Tx_i}{Tx_{SARi}} \cdot \frac{SAR_i}{SAR_{lim}} \qquad (2)$$

where $SAR_{lim}$ is a SAR limit, $SAR_{norm\_combined}$ is the combined normalized SAR distribution for simultaneous transmission from the active antennas, i is an index for the active antennas, $SAR_i$ is the SAR distribution for the $i^{th}$ active antenna, $Tx_i$ is the transmission power level for the $i^{th}$ active antenna, $TX_{SARi}$ is the transmission power level for the SAR distribution for the $i^{th}$ active antenna, and K is the number of the active antennas.

Equation (2) may be rewritten as follows:

$$SAR_{norm\_combined} = \sum_{i=1}^{i=K} \frac{Tx_i}{Tx_{SARi}} \cdot SAR_{norm\_i} \qquad (3a)$$

where $SAR_{norm\_i}$ is the normalized SAR distribution for the $i^{th}$ active antenna. In the case of simultaneous transmissions using multiple active antennas at the same transmitting frequency (e.g., multiple in multiple out (MIMO)), the combined normalized SAR distribution is obtained by summing the square root of the individual normalized SAR distributions and computing the square of the sum, as given by the following:

$$SAR_{norm\_combined\_MIMO} = \left[\sum_{i=1}^{i=K} \sqrt{\frac{Tx_i}{Tx_{SARi}} \cdot SAR_{norm\_i}}\right]^2 . \qquad (3b)$$

In another example, normalized SAR distributions for different frequency bands may be stored in the memory. In this example, a normalized SAR distribution for a transmit scenario in which two or more frequency bands are active may be generated by combining the normalized SAR distributions for the two or more active frequency bands. For the case where the transmission power levels are different for the active frequency bands, the normalized SAR distribution for each of the active frequency bands may be scaled by the respective transmission power level before combining the normalized SAR distributions for the active frequency bands. In this example, the combined SAR distribution may also be computed using Equation (3a) in which i is an index for the active frequency bands, $SAR_{norm\_i}$ is the normalized SAR distribution for the $i^{th}$ active frequency band, $Tx_i$ is the transmission power level for the $i^{th}$ active frequency band, and $TX_{SARi}$ is the transmission power level for the normalized SAR distribution for the $i^{th}$ active frequency band.

To assess RF exposure from transmissions using the second technology (e.g., 5G in 24 to 60 GHz bands, IEEE 802.11ad, 802.11ay, etc.), the wireless device may include multiple PD distributions for the second technology stored in the memory (e.g., memory 282 of FIG. 2 or memory 336 of FIG. 3). Each of the PD distributions may correspond to a respective one of multiple transmit scenarios supported by the wireless device for the second technology. The transmit scenarios may correspond to various combinations of antennas (e.g., antennas 252a through 252r of FIG. 2 or antenna 303 of FIG. 3), frequency bands, channels and/or body positions, as discussed further below.

The PD distribution (also referred to as PD map) for each transmit scenario may be generated based on measurements (e.g., E-field measurements) performed in a test laboratory using a model of a human body. After the PD distributions are generated, the PD distributions are stored in the memory to enable the processor (e.g., processor 266 of FIG. 2 or processor 334 of FIG. 3) to assess RF exposure in real time, as discussed further below. Each PD distribution includes a set of PD values, where each PD value may correspond to a different location (e.g., on the model of the human body).

The PD values in each PD distribution correspond to a particular transmission power level (e.g., the transmission power level at which the PD values were measured in the test laboratory). Since PD scales with transmission power level, the processor may scale a PD distribution for any transmission power level by multiplying each PD value in the PD distribution by the following transmission power scaler:

$$\frac{Tx_c}{Tx_{PD}} \qquad (4)$$

where $Tx_c$ is a current transmission power level for the respective transmit scenario, and $Tx_{PD}$ is the transmission power level corresponding to the PD values in the PD distribution (e.g., the transmission power level at which the PD values were measured in the test laboratory).

As discussed above, the wireless device may support multiple transmit scenarios for the second technology. In certain aspects, the transmit scenarios may be specified by a set of parameters. The set of parameters may include one or more of the following: an antenna parameter indicating one or more antennas used for transmission (i.e., active antennas), a frequency band parameter indicating one or more frequency bands used for transmission (i.e., active frequency bands), a channel parameter indicating one or more channels used for transmission (i.e., active channels), a body position parameter indicating the location of the wireless device relative to the user's body location (head, trunk, away from the body, etc.), and/or other parameters. In cases where the wireless device supports a large number of transmit scenarios, it may be very time-consuming and expensive to perform measurements for each transmit scenario in a test setting (e.g., test laboratory). To reduce test time, measurements may be performed for a subset of the transmit scenarios to generate PD distributions for the subset of transmit scenarios. In this example, the PD distribution for each of the remaining transmit scenarios may be generated by combining two or more of the PD distributions for the subset of transmit scenarios, as discussed further below.

For example, PD measurements may be performed for each one of the antennas to generate a PD distribution for each one of the antennas. In this example, a PD distribution for a transmit scenario in which two or more of the antennas are active may be generated by combining the PD distributions for the two or more active antennas.

In another example, PD measurements may be performed for each one of multiple frequency bands to generate a PD distribution for each one of the multiple frequency bands. In this example, a PD distribution for a transmit scenario in which two or more frequency bands are active may be generated by combining the PD distributions for the two or more active frequency bands.

In certain aspects, a PD distribution may be normalized with respect to a PD limit by dividing each PD value in the PD distribution by the PD limit. In this case, a normalized PD value exceeds the PD limit when the normalized PD value is greater than one, and is below the PD limit when the normalized PD value is less than one. In these aspects, each of the PD distributions stored in the memory may be normalized with respect to a PD limit.

In certain aspects, the normalized PD distribution for a transmit scenario may be generated by combing two or more normalized PD distributions. For example, a normalized PD distribution for a transmit scenario in which two or more antennas are active may be generated by combining the normalized PD distributions for the two or more active antennas. For the case in which different transmission power levels are used for the active antennas, the normalized PD distribution for each active antenna may be scaled by the respective transmission power level before combining the normalized PD distributions for the active antennas. The normalized PD distribution for simultaneous transmission from multiple active antennas may be given by the following:

$$PD_{norm\_combined} = \sum_{i=1}^{i=L} \frac{Tx_i}{Tx_{PDi}} \cdot \frac{PD_i}{PD_{lim}} \quad (5)$$

where $PD_{lim}$ is a PD limit, $PD_{norm\_combined}$ is the combined normalized PD distribution for simultaneous transmission from the active antennas, i is an index for the active antennas, $PD_i$ is the PD distribution for the $i^{th}$ active antenna, $Tx_i$ is the transmission power level for the $i^{th}$ active antenna, $Tx_{PDi}$ is the transmission power level for the PD distribution for the $i^{th}$ active antenna, and L is the number of the active antennas.

Equation (5) may be rewritten as follows:

$$PD_{norm\_combined} = \sum_{i=1}^{i=L} \frac{Tx_i}{Tx_{PDi}} \cdot PD_{norm\_i} \quad (6a)$$

where $PD_{norm\_i}$ is the normalized PD distribution for the $i^{th}$ active antenna. In the case of simultaneous transmissions using multiple active antennas at the same transmitting frequency (e.g., MIMO), the combined normalized PD distribution is obtained by summing the square root of the individual normalized PD distributions and computing the square of the sum, as given by the following:

$$PD_{norm\_combined\_MIMO} = \left[\sum_{i=1}^{i=L} \sqrt{\frac{Tx_i}{Tx_{PDi}} \cdot PD_{norm\_i}}\right]^2. \quad (6b)$$

In another example, normalized PD distributions for different frequency bands may be stored in the memory. In this example, a normalized PD distribution for a transmit scenario in which two or more frequency bands are active may be generated by combining the normalized PD distributions for the two or more active frequency bands. For the case where the transmission power levels are different for the active frequency bands, the normalized PD distribution for each of the active frequency bands may be scaled by the respective transmission power level before combining the normalized PD distributions for the active frequency bands. In this example, the combined PD distribution may also be computed using Equation (6a) in which i is an index for the active frequency bands, $PD_{norm\_i}$ is the normalized PD distribution for the $i^{th}$ active frequency band, $Tx_i$ is the transmission power level for the $i^{th}$ active frequency band, and $Tx_{PDi}$ is the transmission power level for the normalized PD distribution for the $i^{th}$ active frequency band.

Example Evaluation of Radio Frequency Exposure with Reduced Power Limit

Figure 4A:
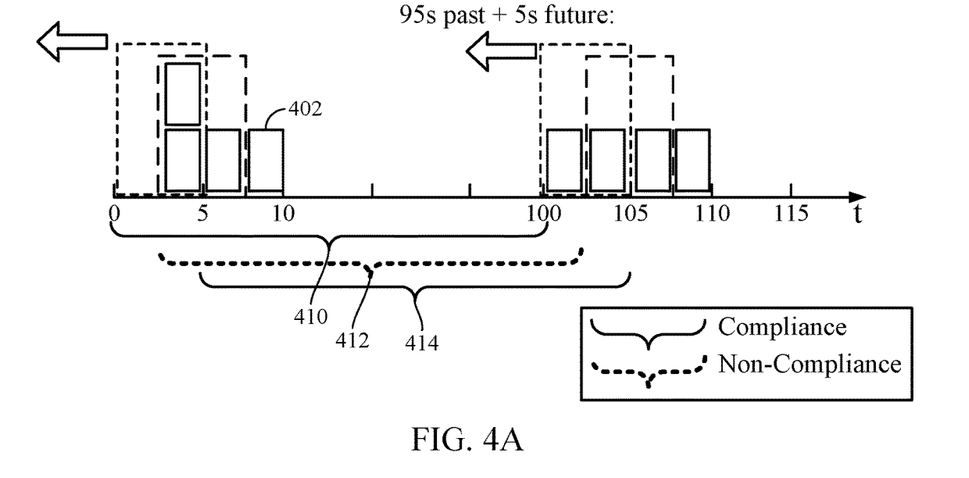
FIG. 4A illustrates various examples of time-averaged RF exposure measurement time windows where a certain RF exposure measurement technique leads to power levels that may exceed an RF exposure limit.

In certain cases, an RF exposure regulation specifies that a time-averaged RF exposure over a time window not exceed an RF exposure limit. This allows the wireless device (e.g., UE 120 of FIG. 1) to briefly exceed the RF exposure limit as long as the time-averaged RF exposure does not exceed the limit. The wireless device may determine maximum allowable power levels for a future time slot to ensure time-averaged RF exposure compliance. In some cases, evaluating the time-averaged RF exposure within the prescribed time window (e.g., 55 seconds for 60 GHz bands, 100 or 360 seconds for ≤6 GHz, etc.) may lead to transmission power levels that exceed the RF exposure limits. For instance, FIG. 4A illustrates various examples of time-averaged RF exposure measurement time windows 410, 412, and 414 where a certain RF exposure measurement technique leads to power levels that exceed an example RF exposure limit of four power blocks 402. In this example, the time window for evaluating exposure compliance is 100 seconds, and the RF exposure is assessed every 5 seconds. Therefore, the RF exposure measurement technique relies on the previous nineteen RF exposure measurements (e.g., SAR measurements and/or PD measurements) taken over 95 seconds to estimate the power level for a future time slot of five seconds. This measurement technique enables the time window 410 and 414 to comply with the RF exposure limit of four power blocks 402, but the time window 412, which begins at 2.5 seconds between the measurement time slots of five seconds, fails to comply resulting in transmissions that use five power blocks 402 over the time window. That is, the example measurement technique used in FIG. 4A cannot guarantee compliance with the RF exposure limit between the measurement interval of five seconds.

Figure 4B:
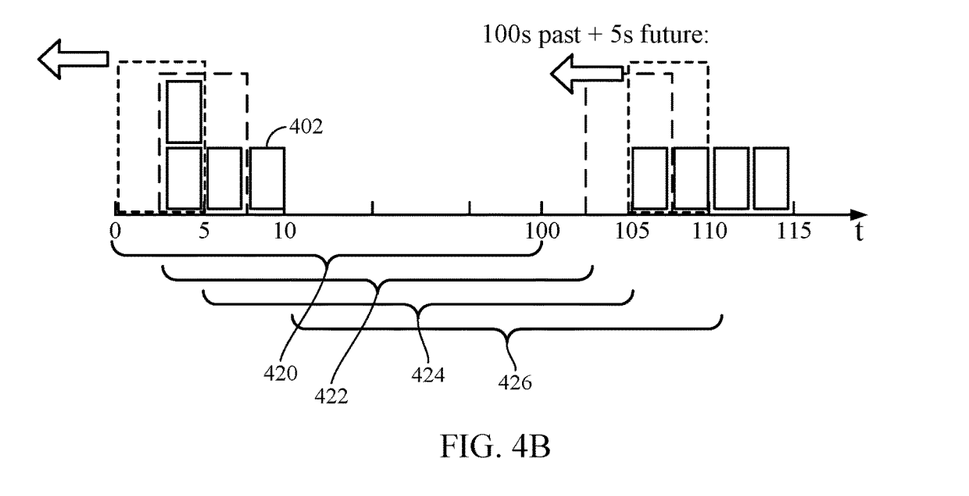
FIG. 4B illustrates various examples of time-averaged RF exposure measurement time windows, in accordance with certain aspects of the present disclosure.

Certain aspects of the present disclosure provide techniques and systems for ensuring the RF exposure limit is continuously satisfied using real-time RF exposure measurements, including between the measurement intervals. For example, FIG. 4B illustrates various examples of time-averaged RF exposure measurement time windows 420, 422, 424, and 426, in accordance with certain aspects of the present disclosure. Instead of taking the time-averaged RF exposure measurements within the time window (e.g., 95 seconds of RF exposure measurements+5 seconds to account for a future time slot), the techniques and systems described herein use a full set of RF exposure measurements during the time window (e.g., 100 seconds of RF exposure measurements) plus a future time slot (e.g., 5 seconds of future time slot). This enables the determination of the power level to continuously comply with the RF exposure limit. As shown, each of the time windows 420, 422, 424, and 426 complies with the RF exposure limit (e.g., four power blocks 402) set in this example. FIG. 4B demonstrates that the time window 422, which begins at 2.5 seconds, complies with the RF exposure limit, including at points in time between the time slot measurement intervals of five seconds.

Figure 5:
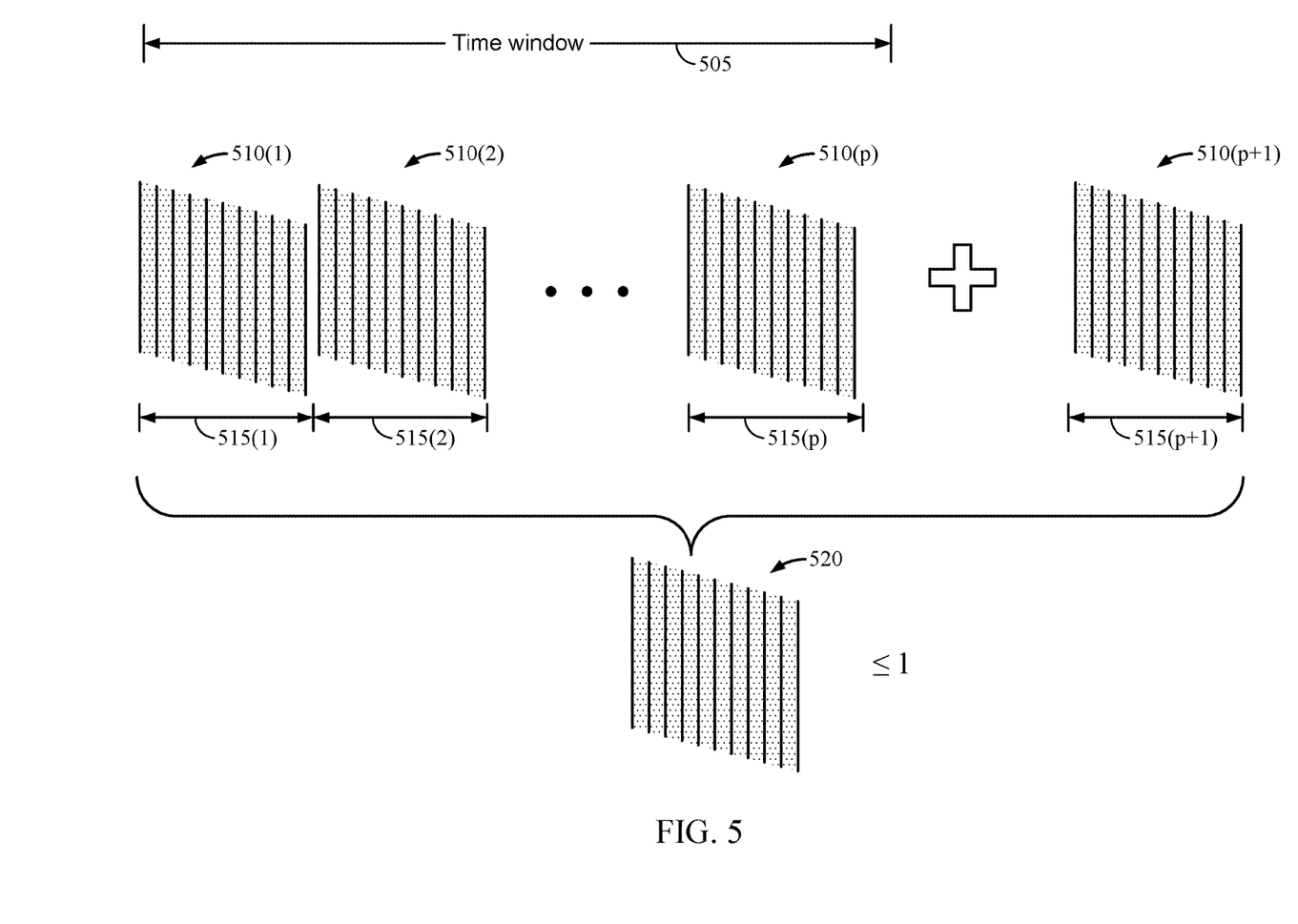
FIG. 5 illustrates an example in which a wireless device computes a time-averaged RF exposure measurement, in accordance with certain aspects of the present disclosure.

FIG. 5 illustrates an example in which the wireless device (e.g., UE 120) computes a time-averaged RF exposure measurement (e.g., a time-averaged SAR distribution or a time-averaged PD distribution) over a time window 505 (e.g., 2 seconds (f>42 GHz), 4 seconds, 100 seconds (f<3 GHz), 6 minutes (f<6 GHz), or a frequency-dependent time-averaging window (e.g., $$\left(e.g., \frac{68}{f^{1.05}} \text{ where } f > 10 \text{ GHz}\right)\right).$$

In this example, the time window 505 is divided into multiple time slots (i.e., time intervals). The time window may be a predetermined time window corresponding to a radio frequency radiation exposure limit set by domestic and/or international regulations. For instance, a 6-minute time window may be divided into 5-second time slots. As other examples, the time window may be in a range from 1 second to 360 seconds or greater. In the example shown in FIG. 5, there are p number of time slots 515(1) to 515(p), and p number of normalized RF exposure measurements 510(1) to 510(p). The number of time slots (p) within the time window 505 (e.g., 100 seconds) may be divided according to a slot duration of the time slots 515(1) to 515(p) (e.g., five seconds), allowing for one more time slot (e.g., p=4, 8, 20, 120, or 200) with respect to the measurement technique described herein with regard to FIG. 4A. Although each of the RF exposure measurements 510(1) to 510(p) is depicted as a two-dimensional distribution in FIG. 5, it is to be appreciated that aspects of the present disclosure are not limited to this example.

The wireless device may determine an RF exposure measurement for each time slot (e.g., according to Equation (3a), (3b), (6a), or (6b)). The RF exposure measurement for a time slot may be generated by combining two or more RF exposure measurements (e.g., averaging the RF exposure measurements or selecting a peak RF exposure measurement). For example, if two or more antennas are active during the time slot, then the wireless device may combine the RF exposure measurements for the two or more active antennas to generate the RF exposure measurement for the time slot. For the case in which different transmission power levels are used for the active antennas, the wireless device may scale the RF exposure measurement for each active antenna by the transmission power level for the antenna.

In certain aspects, the transmit scenario and/or transmission power levels may vary over the time window 505. In these aspects, the transmit scenario may be approximately constant over one time slot, but may vary from time slot to time slot within the time window 505. The wireless device may determine the RF exposure measurement for each time slot based on the transmit scenario and time-averaged transmission power levels for the time slot (e.g., according to Equation (3a) or 3(b)).

The wireless device may determine maximum allowable power levels for a future time slot to ensure time-averaged RF exposure compliance. In this regard, the time slots 515(1) to 515(p) in FIG. 5 may correspond to previous transmissions by the wireless device, and the time slot 515(p+1) may correspond to the future time slot. In this regard, the time slot 515(p+1) is referred to as the future time slot below. The future time slot 515(p+1) may have a duration (e.g., 5 s) equal to each of the number of time slots 515(1) to 515(p). To ensure compliance with the RF exposure limit, the RF exposure measurements may be averaged over p rather than averaging over (p+1) as follows:

$$\frac{1}{p}\left[\left(\sum_{k=1}^{p} \frac{avgP_{tk}}{P_{limit}}\right) + \frac{\text{Max\_avg}P_{tF}}{P_{limit}}\right] \leq 1 \qquad (7)$$

where $avgP_{tk}$ is the transmission power transmitted in the past $k^{th}$ time slots 515(1) to 515(p), $P_{limit}$ is the transmission power limit needed to reach the exposure limit, $\text{Max\_avg}P_{tF}$ is the maximum allowed transmission power for the future time slot 515(p+1).

Equation (7) may be rewritten to average over (p+1) time slots as follows:

$$\frac{1}{p+1}\left[\left(\sum_{k=1}^{p} \frac{avgP_{tk}}{P_{limit}}\right) + \frac{\text{Max\_avg}P_{tF}}{P_{limit}}\right] \leq \frac{p}{p+1} \qquad (8)$$

The wireless device may compute $\text{Max\_avg}P_{tF}$ according to Equation (8) using the normalized reduced power limit $$\left(\frac{p}{p+1}\right)$$

to ensure compliance wan the exposure limit. That is, the (normalized) reduced power limit may be based on a ratio between the number of time slots (p) and the number of time slots plus one (p+1). As an example, the time window may have twenty time slots 515(1) to 515(p), resulting in a reduced power limit at or below $$\frac{p}{p+1} \cdot 100\% \left(e.g., \frac{20}{20+1} \cdot 100\%\right)$$

of the transmission power limit (e.g., 1 for the normalized limit or $P_{limit}$ for the actual limit). In certain aspects, the transmission power limit may be reduced by the following expression in decibels:

$$10 * \log 10\left(\frac{p+1}{p}\right) dB \qquad (9)$$

Equation (8) may also be rewritten to provide an expression equal to or less than one as follows:

$$\frac{1}{p+1}\left[\left(\sum_{k=1}^{p} \frac{avgP_{tk}}{\frac{p}{p+1} * P_{limit}}\right) + \frac{\text{Max\_avg}P_{tF}}{\frac{p}{p+1} * P_{limit}}\right] \leq 1 \qquad (10)$$

In this example, it is assumed that the transmission power levels for the RF exposure measurements 510(1) to 510(p−1) are known by the wireless device since they correspond to previous transmissions. For example, the wireless device may record the transmission power levels and transmit scenario for each of the time slots 515(1) to 515(p) in the memory (e.g., memory 282 of FIG. 2 or memory 336 of FIG. 3), and use the recorded transmission power levels and transmit scenarios for the time slots 515(1) to 515(p) to determine the RF exposure measurements 510(1) to 510(p) for these time slots. For time slots 515(1) to 515(p), the RF exposure measurements for the $k^{th}$ time slot 515(k) may be determined using Equation (3a), (3b), (6a), or (6b) for all transmission scenarios and power levels that were active during the $k^{th}$ time slot 515(k).

In this example, the transmission power levels for the RF exposure measurement 510(p+1) corresponding to the future time slot 515(p+1) are variables to be solved by the wireless device. To determine the maximum allowable power level for the future time slot 515(p+1), the wireless device may compute the time-averaged RF exposure measurement 520 in which the transmission power levels for the future time slot 515(p+1) are variables in the time-averaged RF exposure measurement 520 (i.e., the time-averaged RF exposure measurement is a function of the transmission power levels for the future time slot 515(p+1)). The wireless device may then determine transmission power levels for the future time slot 515(p+1) such that the peak value in the time-averaged RF exposure measurement is equal to or less than one (e.g., satisfies the condition 1 in Equation (7) or (10)). The wireless device uses the transmission power levels that satisfy the condition for RF exposure compliance as the maximum allowable power level for the future time slot 515(p+1), and sets the transmission power levels for the future time slot 515(p+1) according to the determined maximum allowable power level. The wireless device may determine the maximum allowable power level for the future time slot 515(p+1) so that the transmission power levels for the future time slot 515(p+1) are ready at the start of the future time slot 515(p+1) for the wireless device to enforce the maximum allowable power level. The wireless device may set the transmission power levels for the future time slot to be no greater than the maximum allowed transmission power level.

Figure 6:
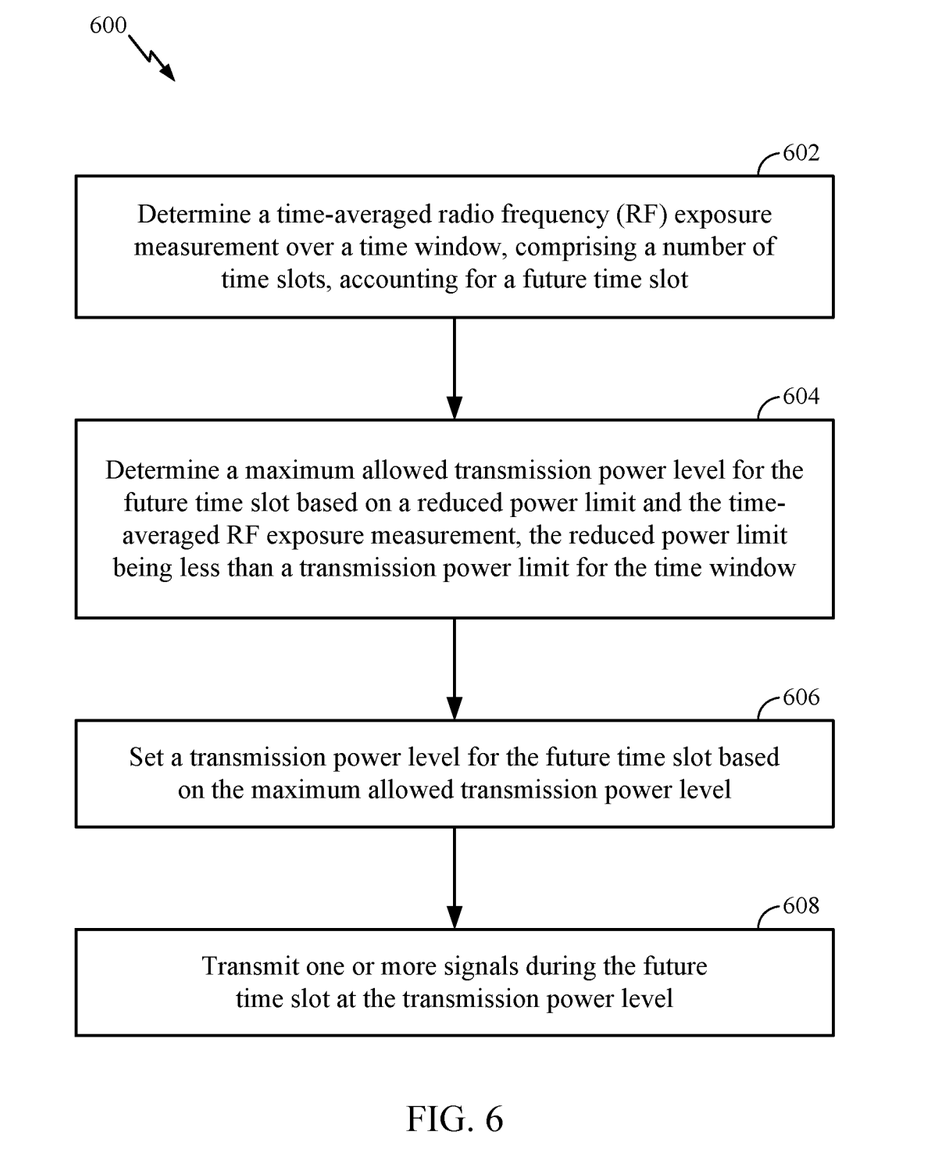
FIG. 6 is a flow diagram of example operations for determining transmission power levels according to RF exposure limits, in accordance with certain aspects of the present disclosure.

FIG. 6 is a flow diagram illustrating example operations 600 for determining transmission power levels according to RF exposure limits, in accordance with certain aspects of the present disclosure. The operations 600 may be performed, for example, by a wireless device (e.g., UE 120 of FIG. 1).

The operations 600 may begin, at block 602, where the wireless device determines a time-averaged radio frequency (RF) exposure measurement over a time window, comprising a number of time slots, accounting for a future time slot (e.g., according to Equation (7), (8), or (10)). At block 604, the wireless device determines a maximum allowed transmission power level (e.g., Max_avgP$_{tF}$) for the future time slot based on a reduced power limit (e.g., $$\left(\text{e.g., } \frac{p}{p+1} * P_{limit}\right)$$

and the time-averaged RF exposure measurement, the reduced power limit being less than a transmission power limit for the time window. At block 606, the wireless device sets a transmission power level for the future time slot based on the maximum allowed transmission power level. At block 608, the wireless device transmits one or more signals during the future time slot at the transmission power level.

The wireless device may determine time-averaged RF exposure measurements according to Equation (7), (8), or (10). In certain aspects, the wireless device may determine time-averaged RF exposure measurements by determining respective RF exposure measurements for each of the time slots, based on a transmit scenario and one or more transmission power levels for the respective time slot, averaging the respective RF exposure measurements for each of the time slots (e.g., $$\left(\text{e.g., } \frac{avgP_{tk}}{P_{limit}} \text{ of Equation (7), (8), or (10)}\right),$$

of Equation (7), (8), or (10)), summing the averaged RF exposure measurements for each of the time slots (e.g., $$\left(\text{e.g., } \sum_{k=1}^{p} \frac{avgP_{tk}}{P_{limit}} \text{ of Equations (7) and (8)}\right),$$

of Equations (7) and (8)), and dividing the summation by one more than the number of time slots to generate the time-averaged RF exposure measurements (e.g., $$\left(\text{e.g., } \frac{1}{p+1}\sum_{k=1}^{p} \frac{avgP_{tk}}{P_{limit}} \text{ of Equation (10)}\right).$$

of Equation (10)).

The wireless device may determine the maximum allowed transmission power level according to Equation (7), (8), or (10). In certain aspects, the wireless device may determine the maximum allowed transmission power level by subtracting the time-averaged RF exposure measurement (e.g., $$\left(\text{e.g., } \frac{1}{p+1}\sum_{k=1}^{p} \frac{avgP_{tk}}{P_{limit}}\right)$$

from the reduced power limit (e.g., $$\left(\text{e.g., } \frac{p}{p+1} * P_{limit}\right)$$

to generate a difference, and multiplying the difference by one more than the number of time slots to calculate the maximum allowed transmission power level.

In the present disclosure, the maximum allowed transmission power level may refer to a maximum allowable power level imposed by an RF exposure limit unless stated otherwise. It is to be appreciated that the maximum allowed transmission power level is not necessarily equal to the absolute maximum power level that complies with an RF exposure limit and may be less than the absolute maximum power level that complies with the RF exposure limit (e.g., to provide a safety margin). The maximum allowed transmission power level may be used to set a power level on a transmission at a transmitter such that the power level of the transmission is not allowed to exceed the maximum allowed transmission power level to ensure RF exposure compliance.

In accordance with certain aspects, the operations 600 may be performed by a transceiver front-end (e.g., transceiver front-end 300 of FIG. 3) of a wireless device, such as the processor 334, TX path 302, and interface 306 of FIG. 3. For example, a processor (e.g., processor 334 of FIG. 3)

may be configured to perform blocks 602, 604, 606 of the operations 600, and an interface (e.g., interface 306) may be configured to output one or more signals for transmission during the future time slot at the transmission power level.

The wireless devices and methods described herein provide various improvements. For instance, the techniques and devices described herein ensure that the RF exposure limits set by domestic or international regulatory bodies are satisfied using real-time RF exposure measurements.

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function.

For example, means for determining, means for setting, means for averaging, means for summing, means for dividing, means for subtracting, and means for multiplying may comprise a processor, such as the transmit processor 264, the TX MIMO processor 266, and/or the controller 280 of the UE 120 illustrated in FIG. 2 or the processor 334 of the transceiver front-end 300 illustrated in FIG. 3. Means for transmitting may include a transceiver front-end circuit (e.g., transceiver front-end circuit 254a through 254r of FIG. 2 or transceiver front-end 300 of FIG. 3) and/or antenna(s) (e.g., antennas 252a through 252r of the UE 120 illustrated in FIG. 2 or antenna 303 illustrated in FIG. 3).

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules, and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user terminal, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC with the processor, the bus interface, the user interface in the case of an access terminal), supporting circuitry, and at least a portion of the machine-readable media integrated into a single chip, or with one or more FPGAs, PLDs, controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communications, comprising:
   at least one processor configured to:
   determine a time-averaged radio frequency (RF) exposure measurement over a time window, comprising a number of time slots, accounting for a future time slot;
   determine a maximum allowed transmission power level for the future time slot based on a reduced power limit and the time-averaged RF exposure measurement, the reduced power limit being less than a transmission power limit for the time window; and
   set a transmission power level for the future time slot based on the maximum allowed transmission power level; and an interface configured to output one or more signals for transmission during the future time slot at the transmission power level.

2. The apparatus of claim 1, wherein the at least one processor is configured to determine the time-averaged RF exposure measurement by:
   determining respective RF exposure measurements for each of the time slots, based on a transmit scenario and one or more transmission power levels for the respective time slot;
   averaging the respective RF exposure measurements for each of the time slots;
   summing the averaged RF exposure measurements for each of the time slots; and
   dividing the summation by one more than the number of time slots to generate the time-averaged RF exposure measurements.

3. The apparatus of claim 1, wherein the at least one processor is configured to determine the maximum allowed transmission power level by:
   subtracting the time-averaged RF exposure measurement from the reduced power limit to generate a difference; and
   multiplying the difference by one more than the number of time slots to calculate the maximum allowed transmission power level.

4. The apparatus of claim 1, wherein the number of time slots is p, and wherein the reduced power limit is at or below $$\frac{p}{p+1} \cdot 100\%$$

of the transmission power limit.

5. The apparatus of claim 1, wherein the reduced power limit is based on a ratio between:
   the number of time slots; and
   the number of time slots plus one.

6. The apparatus of claim 1, wherein the time window is a predetermined time window corresponding to a radio frequency radiation exposure limit, and the time-averaged RF exposure measurement comprises at least one of a time-averaged specific absorption rate (SAR) or a time-averaged power density.

7. The apparatus of claim 1, wherein the time window is a predetermined time window in a range from 1 second to 360 seconds.

8. The apparatus of claim 1, wherein the future time slot has a duration equal to each of the number of time slots.

9. The apparatus of claim 1, wherein the at least one processor is configured to set the transmission power level for the future time slot to be no greater than the maximum allowed transmission power level.

10. A method for wireless communications, comprising:
    determining a time-averaged radio frequency (RF) exposure measurement over a time window, comprising a number of time slots, accounting for a future time slot;
    determining a maximum allowed transmission power level for the future time slot based on a reduced power limit and the time-averaged RF exposure measurement, the reduced power limit being less than a transmission power limit for the time window;
    setting a transmission power level for the future time slot based on the maximum allowed transmission power level; and
    transmitting one or more signals during the future time slot at the transmission power level.

11. The method of claim 10, wherein determining the time-averaged RF exposure measurement comprises:
    determining respective RF exposure measurements for each of the time slots, based on a transmit scenario and one or more transmission power levels for the respective time slot;
    averaging the respective RF exposure measurements for each of the time slots;
    summing the averaged RF exposure measurements for each of the time slots; and
    dividing the summation by one more than the number of time slots to generate the time-averaged RF exposure measurement.

12. The method of claim 10, wherein determining the maximum allowed transmission power level comprises:
    subtracting the time-averaged RF exposure measurement from the reduced power limit to generate a difference; and
    multiplying the difference by one more than the number of time slots to calculate the maximum allowed transmission power level.

13. The method of claim 10, wherein the number of time slots is p, and wherein the reduced power limit is at or below $$\frac{p}{p+1} \cdot 100\%$$

of me transmission power limit.

14. The method of claim 10, wherein the reduced power limit is based on a ratio between:
    the number of time slots; and
    the number of time slots plus one.

15. The method of claim 10, wherein the time window is a predetermined time window corresponding to a radio frequency radiation exposure limit, and the time-averaged RF exposure measurement comprises at least one of a time-averaged specific absorption rate (SAR) or a time-averaged power density.

16. The method of claim 10, wherein the time window is a predetermined time window in a range from 1 second to 360 seconds.

17. The method of claim 10, wherein the future time slot has a duration equal to each of the number of time slots.

18. The method of claim 10, wherein setting the transmission power level comprises setting the transmission power level for the future time slot to be no greater than the maximum allowed transmission power level.

19. An apparatus for wireless communications, comprising:
    means for determining a time-averaged radio frequency (RF) exposure measurement over a time window, comprising a number of time slots, accounting for a future time slot;
    means for determining a maximum allowed transmission power level for the future time slot based on a reduced power limit and the RF exposure measurement, the reduced power limit being less than a transmission power limit for the time window;
    means for setting a transmission power level for the future time slot based on the maximum allowed transmission power level; and
    means for transmitting one or more signals during the future time slot at the transmission power level.

20. The apparatus of claim 19, wherein means for determining the time-averaged RF exposure measurement comprises:
- means for determining respective RF exposure measurements for each of the time slots, based on a transmit scenario and one or more transmission power levels for the respective time slot;
- means for averaging the respective RF exposure measurements for each of the time slots;
- means for summing the averaged RF exposure measurements for each of the time slots; and
- means for dividing the summed, averaged RF exposure measurements by one more than the number of time slots to generate the time-averaged SAR.

* * * * *